United States Patent [19]

Bacher et al.

[11] Patent Number: 4,732,734
[45] Date of Patent: Mar. 22, 1988

[54] METHOD FOR PREVENTING FLUOROELASTOMER-RELATED HYDROLYSIS OF FLUORINE-CONTAINING GAS STREAMS IN CONTACT WITH FLUOROELASTOMERIC ARTICLES OF AN INDUSTRIAL GAS STREAM HANDLING SYSTEM

[75] Inventors: Walter Bacher, Stutensee; Wilhelm Bier, Eggenstein-Leop.; Franz-Willi Treffner, Bochum; Gerd Höfert, Fasanenweg 8, 2070 Ahrensburg, all of Fed. Rep. of Germany

[73] Assignees: Kernforschungszentrum Karlsruhe GmbH, Karlsruhe; Gerd Höfert, Ahrensburg; Steag Kernenergie GmbH, Essen, all of Fed. Rep. of Germany

[21] Appl. No.: 868,111

[22] Filed: May 29, 1986

[30] Foreign Application Priority Data

Jul. 15, 1985 [DE] Fed. Rep. of Germany ....... 3525203

[51] Int. Cl.$^4$ ............................................. C23F 15/00
[52] U.S. Cl. ............................................. 422/1; 55/2; 55/17
[58] Field of Search ................. 277/DIG. 6; 55/2, 17, 55/385 A; 525/276, 312, 340, 263, 351, 403; 524/544; 422/1

[56] References Cited

U.S. PATENT DOCUMENTS

| | | | |
|---|---|---|---|
| 3,108,018 | 10/1963 | Lewis | 277/DIG. 6 |
| 4,151,342 | 4/1979 | Uchino et al. | 525/351 |
| 4,196,255 | 4/1980 | Suzuki et al. | 525/403 |
| 4,543,394 | 9/1985 | Finlay et al. | 525/276 |

FOREIGN PATENT DOCUMENTS

| | | | |
|---|---|---|---|
| 3338122 | 5/1985 | Fed. Rep. of Germany . | |
| 2356344 | 1/1978 | France . | |
| 148952 | 11/1979 | Japan | 277/DIG. 6 |
| 1477131 | 6/1977 | United Kingdom . | |

*Primary Examiner*—David L. Lacey
*Attorney, Agent, or Firm*—Spencer & Frank

[57] ABSTRACT

A method for preventing fluoroelastomer-related hydrolysis of a gas stream comprised of a fluorine-containing substance and contained in an industrial system provided with at least one fluoroelastomeric article, including the step of including in portions of the industrial system which contact the gas stream only fluoroelastomeric articles comprised of a fluoroelastomer and lead oxide, the lead oxide content corresponding to a lead percentage in the fluoroelastomer ranging from 1 to 10 percent by weight preferably from 1 to 5 percent by weight, optionally 3 percent by weight. The fluoroelastomeric article may be a seal for the industrial gas stream-handling system. Further, the fluorine-containing substance may be selected from the group consisting of $UF_6$, $HF$, $BF_3$, $SiF_4$, $MoF_6$, $WF_6$, halogen fluorides, and mixtures thereof.

5 Claims, No Drawings

METHOD FOR PREVENTING FLUOROELASTOMER-RELATED HYDROLYSIS OF FLUORINE-CONTAINING GAS STREAMS IN CONTACT WITH FLUOROELASTOMERIC ARTICLES OF AN INDUSTRIAL GAS STREAM HANDLING SYSTEM

BACKGROUND OF THE INVENTION

1. Field of the Invention

The present invention relates to a method for preventing the formation of hydrolysis products of fluorine-containing gas streams, such as uranium hexafluoride ($UF_6$) and/or gaseous fluorination agents, in industrial systems handling such gas streams in which fluoroelastomers are conjointly used in articles, such as seals.

2. Background of the Art

The use of commercially available fluoroelastomers, such as those bearing the trade names Viton® and Technoflon®, marketed respectively by E. I. Dupont de Nemours of Wilmington, Del. and Montecatini of Milan, Italy, as sealing materials in plants handling $UF_6$ is known. Fluoroelastomeric seals and related flluoroelastomeric articles are used to isolate the process gas of an industrial system (for example, $UF_6$ alone or with additional gases) from the atmosphere, as well as internally, for example, in isotope separating systems to maintain separate gas streams of different $UF_6$ concentrations and isotope concentrations, respectively.

The great drawback of previously employed fluoroelastomers is that constituents thereof react chemically even at room temperature with the hydrogen fluoride (HF) which is always present in industrial $UF_6$, and decompose the HF while forming water. Liberated water then reacts with $UF_6$ and decomposes the $UF_6$ while forming HF, resulting in a cyclically continuous decomposition of the $UF_6$.

Stated more precisely, additives in the form of highly basic materials are required for the manufacture of fluoroelastomers and include oxides, hydroxides and/or carbonates of alkaline earth metals and/or similar oxygen-containing compounds of the Group II metals. These additive compounds are capable of chemically binding with, i.e., reacting with, the HF in the $UF_6$ gas. In this reaction, water ($H_2O$) is formed according to the following schematic equation:

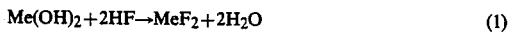

$$Me(OH)_2 + 2HF \rightarrow MeF_2 + 2H_2O \quad (1)$$

where Me represents an alkaline earth metal. This $H_2O$ then reacts with $UF_6$ in the surrounding gas phase according to the following equation:

$$UF_6 + 2H_2O \rightarrow UO_2F_2 + 4HF \quad (2)$$

The HF produced thereby is able to form $H_2O$ again according to the reaction of equation (1) so that a continuous $UF_6$ decomposition may undesirably develop.

The $UO_2F_2$ from the reaction of equation (2) precipitates in the form of a dust (hereinafter referred to as hydrolysis dust) which, sooner or later, deposits in sensitive regions, e.g., in the partition structures of isotope separating systems, such as gas diffusion systems, separating nozzle systems, and/or gas ultracentrifuge systems. Such deposits may partially clog and/or change the mechanical characteristics of these sensitive regions.

To avoid these drawbacks, metallic seals have been used instead of elastomeric seals. The use of metallic seals, however, sometimes requires complicated structural modifications to enable the metallic seals to absorb the required high deformation forces. Moreover, metallic seals are more expensive than elastomeric seals.

SUMMARY OF THE INVENTION

It is an object of the present invention to overcome the drawbacks of using conventional fluoroelastomers in systems which handle gas streams comprised of fluorine-containing substances which could release $H_2O$ from conventional fluoroelastomers with which they come in contact or which are themselves sensitive to $H_2O$. It is a further object of the present invention to substantially prevent the formation of hydrolysis products of uranium hexafluoride ($UF_6$) which result when, first, hydrogen fluoride (HF) always present in industrial $UF_6$ process gas and, for example, an alkaline earth metal oxide present in the fluoroelastomer as a result of the manufacturing process employed therefor react to form $H_2O$, and, second, the liberated $H_2O$ reacts with the $UF_6$ and hydrolytically decomposes same to form HF and $UO_2F_2$, which HF is able to form $H_2O$ again so that a cyclically continuous decomposition of $UF_6$ results.

These objects are accomplished in a surprisingly simple manner in that conventional fluoroelastomers are replaced by fluoroelastomers which have a lead oxide (PbO) content corresponding to a lead (Pb) percentage in the fluoroelastomer ranging from 1 to 10 percent by weight. Particularly preferred is the use of fluoroelastomers having a PbO content corresponding to a Pb percentage in the fluoroelastomer ranging from 1 to 5 weight percent, optimally 3 weight percent. Even under long-term contact with industrial $UF_6$, no hydrolysis dust formation was observed for the inventive elastomers.

The present invention thus provides a method of preventing fluoroelastomer-related hydrolysis of a gas stream comprised of a fluorine-containing substance which gas stream is contained in an industrial system provided with at least one fluoroelastomeric article, in which the method includes providing at least one fluoroelastomeric article comprised of a fluoroelastomer and lead oxide, the lead oxide content corresponding to a lead percentage in the fluoroelastomer ranging from 1 to 10 percent by weight. The fluoroelastomeric article may be a seal for the industrial system.

The advantages realized with the article and method according to the present invention include retention of the fluoroelastomer's characteristic Shore hardness, bounce back elasticity, etc. despite the lead oxide constituent therein. Further, hydrolysis dust formation, which heretofore led to annoying deposits, for example, in isotope separating units of isotope separating systems, is prevented. Hydrolysis dust formation is prevented even if the fluoroelastomers according to the invention are exposed to $UF_6$, $UF_6/H_2$, $UF_6/He$ and mixtures thereof at temperatures ranging up to 50° C. For fluorination agents, the occurrence of solid, hard to volatilize, and/or explosive hydrolysis products can be avoided at least at temperatures ranging from $-50°$ C. to $+50°$ C. Most advantageously, the fluoroelastomeric articles according to the present invention can be used universally, because of their consistently high resistance to temperatures, solvents, acids and radioactive radiation.

In principle, the fluoroelastomers according to the present invention can be used with great advantage, compared to previously used, commercially available fluoroelastomeric seals, wherever gas streams are to be handled which could release $H_2O$ if they came in contact with the conventional fluoroelastomers and/or which are themselves sensitive to $H_2O$, i.e., react and form hydrolysis products which may be solids, hard to volatilize, and/or explosive. Such gas streams may be composed of fluorination agents, such as HF, $BF_3$, $SiF_4$, $MoF_6$, $WF_6$, halogen fluorides including at least one fluorine atom and one or more halogen atoms selected from fluorine, chlorine, bromine and iodine, and other gaseous fluorination agents or gases which contain the above-mentioned compounds as additives or impurities.

It is expected that the fluoroelastomers according to the present invention will retain their advantageous characteristics during continuous exposure to such gas streams, even over many years, for example, up to 10 years.

The invention will now be explained in greater detail with the aid of two exemplary tests performed on systems including a fluoroelastomer according to the present invention having 3 weight percent PbO. The fluoroelastomer tested was prepared by blending 97 grams of basic fluoropolymer material with 3 grams of PbO. The blended material was tested in Test 1. For Test 2, seals were needed for testing purposes and the blended fluoroelastomer was moulded into the desired shaped by pressing.

Test 1

In a laboratory test, 2 g of the fluoroelastomer employed according to the invention (3 weight % PbO) were charged along with 60 mbar $UF_6$ in a high-grade steel reaction vessel for 2000 hours. After a slight initial reaction which, however, did not result in the formation of any solid uranium compounds externally of the elastomer, i.e., $UF_6$ loss and increase in weight of the elastomer matched precisely, no further reaction took place between the fluoroelastomer and the $UF_6$.

Next, 5 volume % HF was added to the $UF_6$, but did not change the stable behavior.

A commercially available fluoroelastomer e.g. PHOENIX 7305/070 was obtained for comparison purposes and was tested according to the same method. After 1000 hours solid uranium compounds had deposited around the elastomer material and the $UF_6$ was spent.

Test 2

A continuous $UF_6$ gas stream test spanning over 2000 hours was performed in an industrial separating nozzle stage whose basic separating element units were equipped with seals having a total weight of about 1 kg and consisting of the fluoroelastomer according to the present invention (3 weight % PbO). No change was noted in the separating characteristics of the separating elements outside of the error tolerance.

Comparable tests with the above-mentioned commercially available fluoroelastomers (c. f. Test 1) over similar periods of time resulted in a noticeable worsening of the separating characteristics.

It will be understood that the above description of the present invention is susceptible to various modifications, changes and adaptations, and the same are intended to be comprehended within the meaning and range of equivalents of the appended claims.

What is claimed is:

1. A method for preventing fluoroelastomer-related hydrolysis of a gas steam comprised of a fluorine-containing substance and contained in an industrial system comprised of at least one fluoroelastomeric article, the method comprising:
    including in portions of the at least one article which contact the gas stream only a fluoroelastomer and lead oxide, the lead oxide content corresponding to a lead percentage in the fluoroelastomer ranging from 1 to 10 percent by weight.

2. The method according to claim 1, wherein the at least one fluoroelastomeric article is a seal for the industrial system.

3. The method according to claim 1, wherein the fluorine-containing substance is selected from the group consisting of $UF_6$, HF, $BF_3$, $SiF_4$, $MoF_6$, $WF_6$, halogen fluorides and mixtures thereof.

4. The method according to claim 1, wherein the lead percentage ranged from 1 to 5 percent by weight.

5. The method according to claim 1, wherein the lead percentage is 3 percent by weight.

* * * * *